(No Model.)
3 Sheets—Sheet 1.
J. D. THOMAS.
MANUFACTURE OF COVERED OR INSULATED WIRE.
No. 271,750.
Patented Feb. 6, 1883.
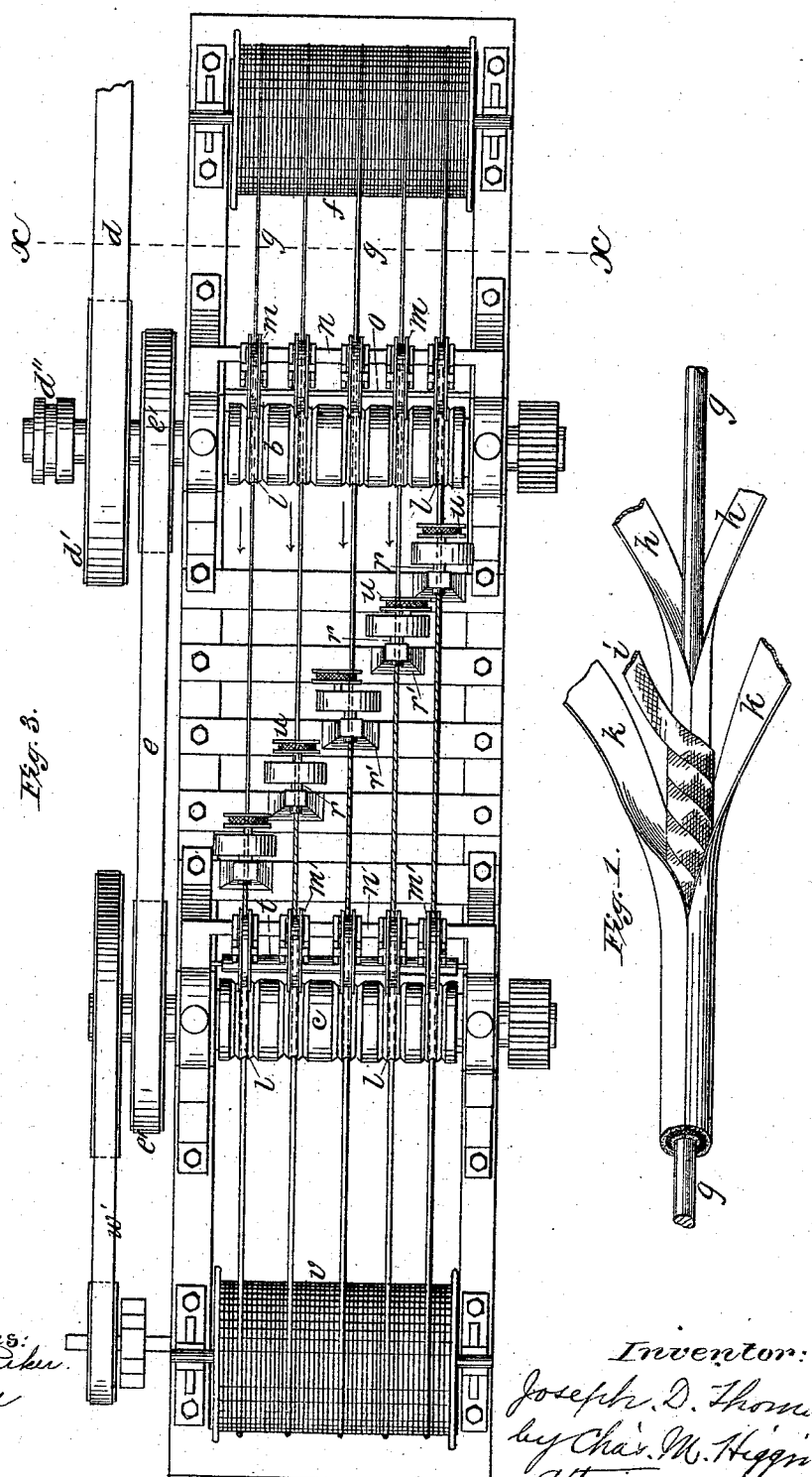

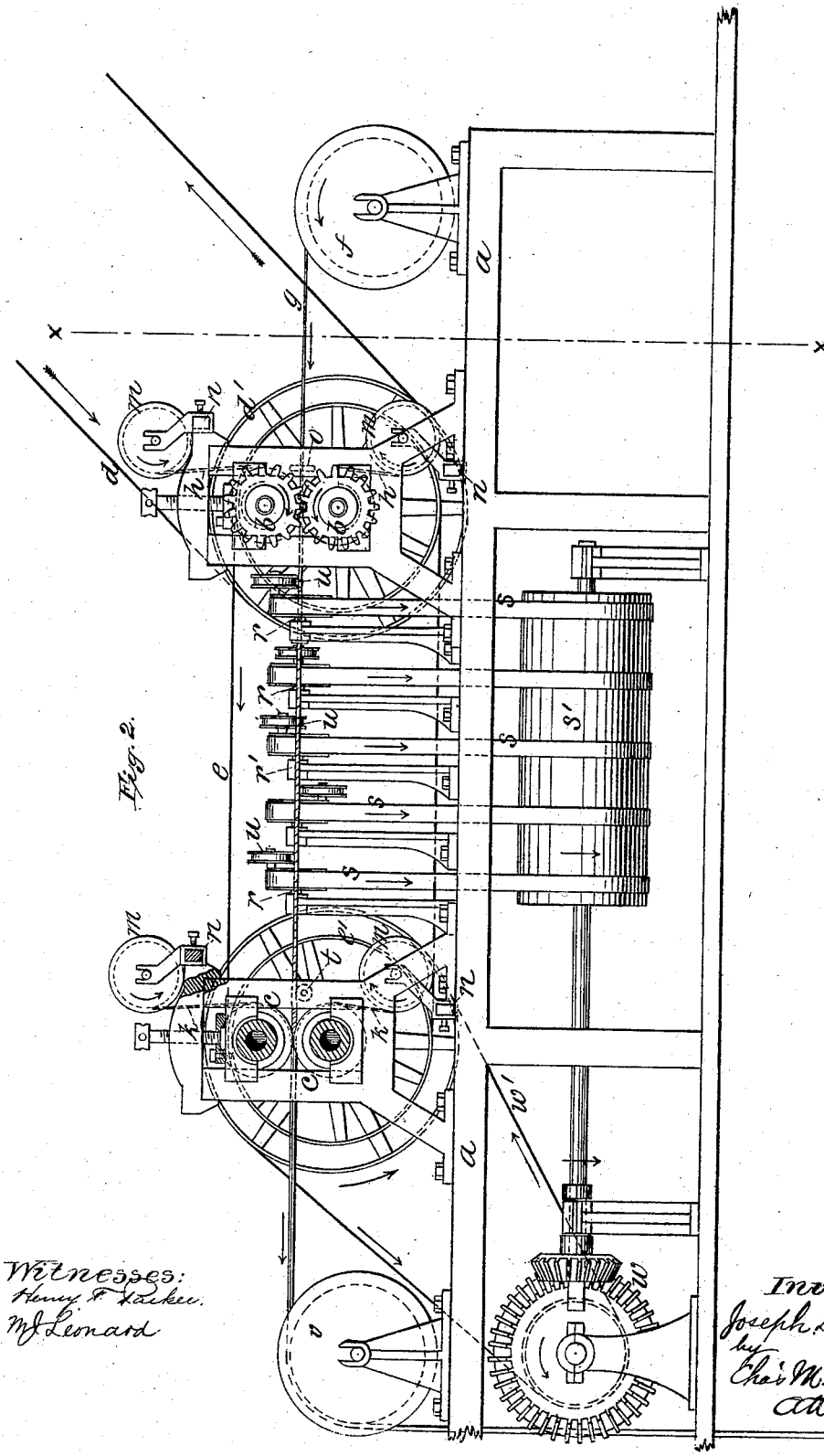

(No Model.) 3 Sheets—Sheet 3.
J. D. THOMAS.
MANUFACTURE OF COVERED OR INSULATED WIRE.
No. 271,750. Patented Feb. 6, 1883.
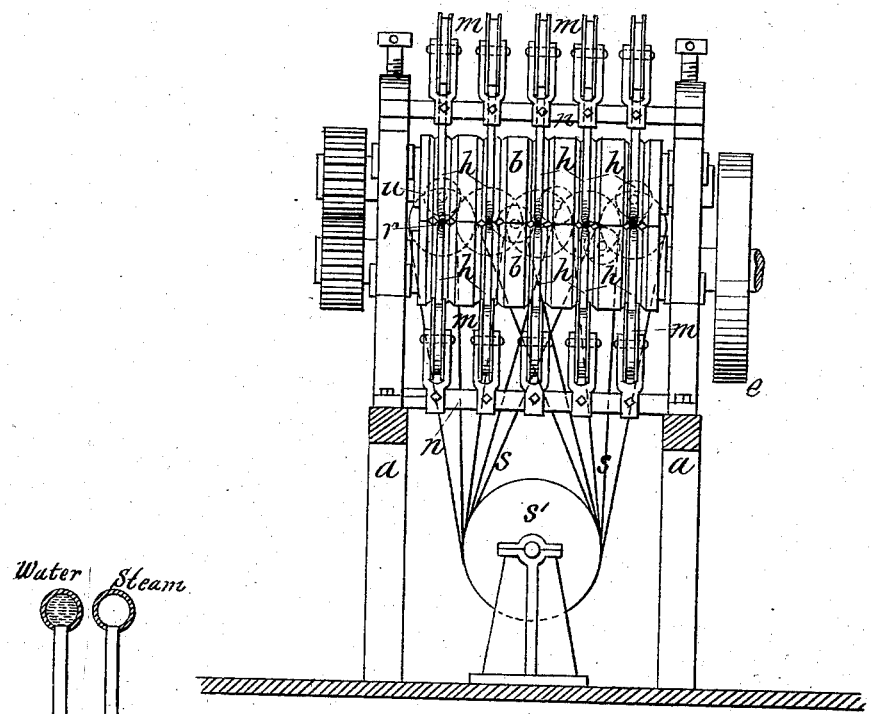
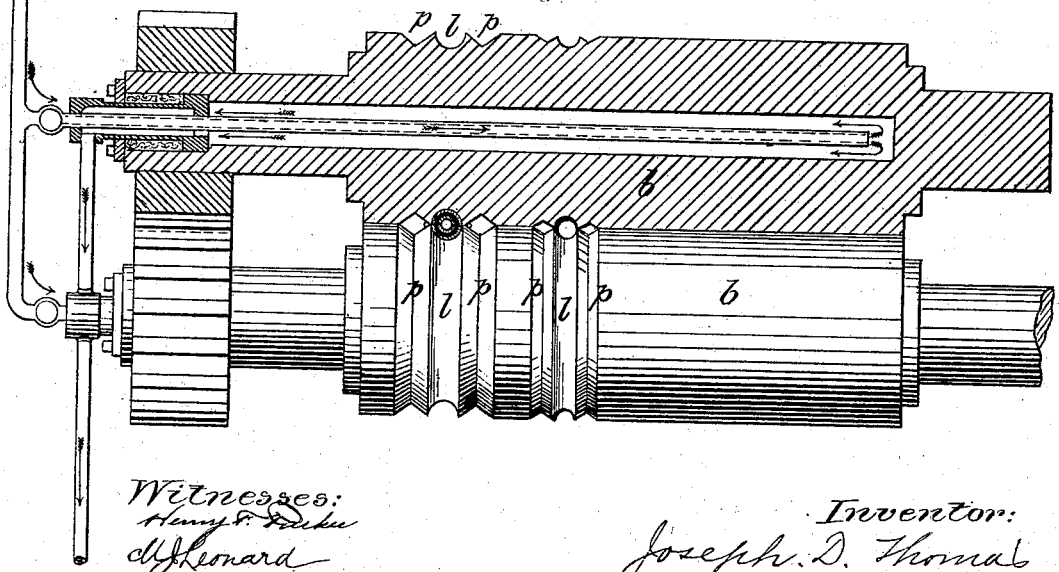

UNITED STATES PATENT OFFICE.

JOSEPH D. THOMAS, OF NEW YORK, N. Y., ASSIGNOR TO LEONARD F. REQUA, OF SAME PLACE.

MANUFACTURE OF COVERED OR INSULATED WIRE.

SPECIFICATION forming part of Letters Patent No. 271,750, dated February 6, 1883.

Application filed March 1, 1882. (No model.)

*To all whom it may concern:*

Be it known that I, JOSEPH D. THOMAS, of the city, county, and State of New York, have invented certain new and useful Improvements in the Manufacture of Covered or Insulated Wires, of which the following is a specification.

Wires for electrical purposes, as is well known, have been covered with rubber or rubber-like coatings for insulation and protection in a variety of ways. One method is by plunging or dipping the wire in a bath of the dissolved or plastic covering material. Another is to wind spirally onto the wire an unvulcanized strip of rubber, which is afterward vulcanized. A later method passes a series of closely-adjoining wires simultaneously between two unvulcanized rubber sheets, which are then drawn between grooved rollers, which press or form the sheets around each wire, and at the same time sever the sheet between each two wires.

My present invention includes an improved mode of covering wires and improved machinery therefor. The mode has some relation to that last named, but is an improvement thereon in that by my machine I cover a series of wires at the same time, each wire independently, with two separate longitudinal strips of rubber, each strip having a width equal to half the circumference of the wire, which strips are curved around the wire and joined together at the edges by passage between multigrooved rolls, whereby much more perfect and accurate work is accomplished, and one set of rolls may be formed to cover a whole series of differently-sized wires simultaneously, which is not the case with the former system. I also apply two successive coatings of this kind to the wire, with an intermediate winding of tarred or cemented tape or cord between the two rubber coverings.

The covering apparatus consists briefly of two successive series of grooved rollers, with separate bobbins carrying the narrow rubber strips, mounted in operative relation with the separate grooves of the rollers, and with tape-winding devices between the two sets of rollers, whereby the wires are drawn through the first set of rolls, and are covered with one rubber coat, then wound with the intermediate tape, and finally covered with a second rubber coat in passing through the second set of rolls, which operations are all performed in a continuous, successive manner. The forming-grooves of the rollers have cutting-edges on each side, and relief or vent grooves are formed on either side of the cutting-edges, so that the strips are pressed and formed accurately around the wires, and the surplus cut off at the junction-line and allowed free escape at the relief-grooves, so that very perfect and rapid work is performed. The several features here outlined embody and express the main points of my invention, which also includes a number of minor features, as hereinafter fully set forth.

In the drawings annexed, Figure 1 represents a piece of wire covered according to my invention, with the covering stripped off for a portion of its length to illustrate the construction thereof. Fig. 2 presents a side elevation of my improved machine for applying this covering, and Fig. 3 a plan view thereof. Fig. 4 is a front elevation or cross-section on the line $x\ x$ of Figs. 2 and 3, looking to the left. Fig. 5 is an enlarged front elevation, partly in section, of one pair of rolls, illustrating the formation of the grooves thereof.

Referring to Figs. 2 and 3, $a\ a$ indicate the base or frame of the machine, on which two pairs or sets of rollers, $b\ b\ c\ c$, are mounted at a certain distance apart, as illustrated. The rollers of each pair are geared together, and are mounted and journaled in standards, with tightening-screws, &c., in the ordinary manner of rolls, as illustrated, which needs no specific description. Motion is imparted to the machine by the driving-belt $d$, which passes over a driving-pulley, $d'$, on the shaft of the lower roller of the first pair, $b$. This pulley is loose upon the shaft, but engaged therewith by a friction-clutch, $d''$, of any suitable construction, as will be understood. One set of rolls is driven from the other set by the belt $e$, which passes around pulleys $e'\ e'$ on the shaft of the lower roller in each set. These pulleys are also frictionally connected with their shaft by an adjustable friction band or clutch, so that they can be set to any desired strain. This frictional driving-connection of the rollers with each other is preferable to a positive connection, as it prevents injurious strains on the wire or its covering while in action, and enables the action of the machine to be more easily regulated.

Now, before describing the general construction and action of the machine, it may be proper to refer to Fig. 1 to describe the covering which the machine is designed to apply—that is, according to my system I first apply to the naked wire $g$ two longitudinal strips, $h\ h$, of rubber or similar material, which strips are each of a width equal to half the circumference of the wire, or slightly more, and are curved closely around the wire and met and joined at the edges, thus completely enveloping the wire. Around this rubber coat is wound a cord or tape, $i$, saturated with some suitable waterproof cement, and upon this intermediate coating is placed a second coating of rubber, formed in two semi-circumferential strips, $k$, joined at the edges in the same manner as the first coating, as fully illustrated in Fig. 1.

Now, the machine shown in Figs. 2, 3, and 4 is of course preferably designed to cover a series of wires simultaneously in the manner described, as seen best in Figs. 3 and 4, and of different sizes, as will be understood. The rollers $a\ a$ and $b\ b$ are hence provided with a corresponding series of grooves, $l\ l$, which are separated some distance from each other, as shown best in Figs. 3, 4, and 5, and are of course of such a size as to equal the diameter of the wire plus the thickness of the covering applied thereto. Above and below each pair of rollers, and on the receiving sides of the same, is arranged a line of independent bobbins, $m\ m'$, corresponding with the grooves of the rollers, each bobbin being mounted in a suitable holder, which is adjustable on the bars $n\ n$, so that the bobbins may be set in exact relation to or coincident with the grooves of the rollers, as seen best in Fig. 4. The strips of rubber with which the wires are to be covered are wound upon and drawn from these bobbins, each of which contains one long closely-coiled strip of the right width to cover half the circumference of the wire, as before stated, and shown best in Figs. 3 and 4, and the bobbins have of course a suitable tension device to retard the unwinding of the strips therefrom, as usual in similar cases. In front of the first set of rollers is arranged a guide-plate, $o$, which is perforated with holes in line with the grooves of the rollers at the junction-line of the same, through which holes the naked wires $g$ are drawn from the reels $f$, and thence guided into the coinciding grooves of the meeting rollers. When the wires are thus entered between the first pair of rollers the rubber strips $h$ are drawn from the bobbins $m$, guided into the grooves of the rollers, and met around the wire at the junction of the rollers, as seen in Figs. 2 and 4. If the machine is now set in motion, the rubber strips and the wires will be drawn through between the revolving rollers, and the strips will be thereby curved around the wires on two sides, met together at the edges, and thus firmly pressed and united around the wire, so as to envelope it in a perfect homogeneous tube of rubber in a very rapid and certain manner. The rubber strips, when thus applied, are of course unvulcanized, while the rollers are heated sufficiently to soften the rubber and render it adhesive, and the strips are made a little wider or thicker than necessary to fill the grooves of the rollers, so that when thus pressed around the wire the strips will unite perfectly at their meeting edges and will be slightly compressed around the wire, so as to insure a perfect formation to the grooves of the rollers and close adhesion to the wire.

It will be noted on reference to Figs. 2 and 4 that the bobbins $m\ m$ are arranged above and below the rollers, in a position at right angles, or nearly so, to the passage of the wires between the rollers, so that the rubber strips $h$, in passing from the bobbins $m\ m$, lie in the grooves of the rollers for about one-quarter of the circumference, and the tension on the strips will thus cause them to become curved or bent into the grooves, so as to be formed into semi-tubes as they approach the wire, and thus adapted to the exact shape of the wire in advance of their entry between the rollers and their compression or union upon the wire, thereby causing the flat strips to be guided in a simple and perfect manner into the grooves of the rollers and around the wire, and preventing all danger of fouling, as will be readily understood.

It may also be noted on reference to Fig. 5 that the rollers are so shaped that a relief-groove, $p$, is cut on either side of the forming-groove $l$, and that the forming-grooves have cutting-edges, which meet together at the junction-line and discharge into the relief-grooves. Hence by this arrangement the rubber will always be sufficiently compressed to form perfectly around the wire without being possible to compress it too much, and all surplus will have free escape at the relief-grooves, and will be cut off smoothly by the cutting-edges, so that the wire will issue with a perfectly-cylindrical coating of rubber of uniform thickness all around the wire, and with a smooth exterior, whereas if the forming-grooves were to closely adjoin, with cutting-edges only between them, adapted to press wide sheets of rubber around a series of wires at the same time and sever the sheets between the wires, as heretofore proposed, the material would have to be displaced or compressed too much between the wires, particularly if the coating were thick, and no relief being provided at the points of compression, the covering would tend to expand after leaving the rollers, producing an irregular, rough, or misshapen exterior, or the rubber would form in a bunch in advance of the rollers and clog their action, which serious objections are by my system completely obviated and rapid and perfect work insured, whether the covering be thick or thin. Now, when the wires are drawn through the first set of rollers and receive their first coating of rubber, as described, they are next guided through hollow spindles $r$, mounted in bearings on standards $r'$, which rise from the base $a$, between the two sets of rollers. These spindles are centered in exact line with the path of the wires from one set of rollers to the other, as shown best in Figs. 2 and 3, and they are revolved by belts $s$, which are driven from the drum $s'$, (see Figs. 2 and 4,) and pass around pulleys on the hollow spindles, as illustrated. From that side of each pulley which is turned toward the first set of rollers projects a crank-pin, on which is mounted a bobbin, $u$, which contains a coil of tape or other fibrous material, which, when the spindle revolves, will thus become wound spirally around the rubber-coated wire as it issues from the first set of rolls, as seen best in Fig. 2. This tape I prefer to be of ordinary woven cotton saturated with Stockholm tar, and so laid upon the wire that its edges will slightly overlap, and sufficiently warmed as it winds upon the rubber-coated wire to soften the tar and render it adhesive, so as to insure a perfectly water-tight covering. Instead of Stockholm tar, however, asphaltum, shellac, or other similar cement may be used, and instead of woven tape a saturated cord or a strip of saturated paper may be used; but the tarred tape is preferable. As the wires leave the winding-spindles $r$ they are next guided over a grooved roller, $t$, arranged in front of the second set of rolls, and, being now provided with the first coating of rubber and the intermediate coating of tape, they are then passed through the second set of rollers, $c$, where a second set of rubber strips, $k$ $k$, are drawn from the bobbins $m'$, and thus formed around the wire in the same manner as the first, thus applying a second and final coat of rubber over the first rubber coat and the intermediate tape. I prefer to have the inner coat of rubber thinner and of a purer quality than the outer; but this is not essential. The grooved roller $t$ serves not only to guide the wires to the forming-rollers, but also stops the vibration of the wires as they enter the rollers, and thus insures smooth action. The now completely-covered wires, after leaving the last rollers, $c$, pass over a felt-covered guide-drum, $v$, and thence descend to the vulcanizing rooms or ovens, where they are laid in large coils until a full charge or certain length of covered wire is passed through—say one or several miles in length—when the machine may be stopped for the day and the product vulcanized, after which the wire is ready for use. It will therefore be seen that by this system each wire is covered separately or independently, and a whole series of differently-sized wires may be thus simultaneously covered by the one machine in a very rapid and simple manner, the action being of such a simple, direct nature that there is little liability of clog or derangement at any point. It may be also noted that as each groove in the rollers is separate from the others, and as each wire is seized and covered separately and provided with separate bobbins and covering-strips adapted to it, hence when the grooves and wires are made of different sizes each wire and its covering-strips are allowed their own independent travel through the machine, due to their relative size, so that no wire or its covering is strained to travel uniformly with the others, and the covering is hence laid thereon more perfectly than could be the case if a whole series of differently-sized wires were passed in unison through closely-grooved rollers, and covered by common webs or sheets, which are cut through and united between the wires, as has been heretofore practiced.

The product of the machine, when finished and vulcanized, as seen in Fig. 1, will be a perfectly-covered wire with a firm, impenetrable coat, perfectly uniform around the wire and smooth and regular on the exterior. The two homogeneous rubber coatings, with the intermediate tarred envelope, form a perfect protection, both against electrical leakage and against the penetration of moisture to the wire, so that the wire thus protected is thoroughly adapted for permanent underground circuits for telegraphic or electrical lighting purposes, as well as for temporary circuits laid overhead or on the surface of the ground, such as for military telegraphs, &c. The wire may not only be laid upon the surface of the ground, but also in gutters or carried through streams without objection, and vehicles may be run over it upon the ground without danger of injury, thus presenting important advantages for many purposes.

It will be seen on reference to Fig. 3 that the winding-spindles $r$ are arranged in stepped or diagonal position between the two sets of rollers, which arrangement, as will be understood, gives sufficient room for the revolution of the several spindles with their bobbins, yet allows the wires to be run comparatively close together, so that a whole series of wires may be covered simultaneously by the same machine without employing very long rollers. The driving-drum $s$, from which the spindles are driven, is revolved by the bevel-gearing $w$ and a belt, $w'$, from a pulley on the shaft of the lower roller in the second set, as seen best in Figs. 2 and 3.

On reference to Fig. 5 it may be observed that the rollers are hollow and connected with steam and water pipes, through suitable tubes and cocks, in the manner usual in similar cases, so that steam or water may be admitted to the interior of the rolls to heat or cool them, as will be understood.

I would remark that the machine might be adapted to form a single rubber strip around the wire of a width equal to the circumference thereof, thus making but one joint on one side of the wire; but this strip would be much more difficult to guide into the grooves of the rollers and to form around the wire, and would be much more likely to clog or foul, whereas the two semi-circumferential strips may be formed around the wire in the simplest and most perfect manner without any danger of fouling. In case, however, a single circumferential strip is used, only one cutting-edge and one relief-groove would be required to each forming-groove of the rollers; but I do not recommend this modification.

I have described the covering-strips as being of unvulcanized rubber, vulcanized after application, which is of course the most desirable material now known; but any similar or equivalent material may be employed, if found suitable.

I am aware that wire has been heretofore proposed to be covered with two longitudinal strips of about semi-circumferential width, joined thereupon by rolls; but heretofore the machines for doing this have been designed for covering but one wire at a time, whereas my machine is designed for covering a series of differently-sized wires simultaneously and independently.

I am also aware that it is quite common to wrap wire with a spiral winding of cord or thread. I am not aware, however, that the two aforesaid operations have ever been performed in direct succession upon the same wire and simultaneously during the progress of the wire, as is done by my system, with one organized machine, where the one coating greatly assists and improves the other and renders the covering of the wire much stronger and more impervious. It will be readily understood that as the tape is wrapped spirally around the first longitudinal covering-strips immediately after the strips are united at their edges after passing between the rollers, it thereby binds said strips firmly to each other and to the wire at the time when the rubber is soft and weak, preventing the opening of the joints by the expansion of the rubber, to which there is frequent tendency after leaving the rollers, and it causes the joints in the two coatings to lie at right angles to each other, the outer joints being spirally overlapping, and hence mutually interlocking, which has the effect of making a very strong and impervious covering.

I do not here claim the improved covered wire or product of this machine, having reserved this for the subject of a separate application.

What I claim is—

1. The method of covering wire herein specified, consisting in first enveloping the wire with a strip or strips of soft rubber applied longitudinally and bent or curved around the wire and united at the edges; second, winding about said covering-strip, as fast as applied, a spiral wrapping of fibrous tape, said operations being performed in direct succession and simultaneously during the progress of the wire, and subsequently vulcanizing the said covering, substantially as herein set forth.

2. The method of covering wire herein specified, consisting in first enveloping the wire with a strip or strips of soft rubber applied longitudinally and bent or curved around the wire and united at the edges; second, winding about said covering-strips, as fast as applied, a spiral wrapping of fibrous tape with its edges spirally overlapping, said operations being performed in direct succession and simultaneously during the progress of the wire, and subsequently vulcanizing the said covering, substantially as herein set forth.

3. The method specified of covering wire with a triple insulating and impervious coating, consisting in first enveloping the wire with a covering strip or strips of rubber or its equivalent laid on longitudinally, curved around the wire, and united at its edges, immediately thereafter winding about said covering a spiral winding of fibrous tape, and then applying a second longitudinal covering over said spiral tape in the same manner as the first, substantially as herein set forth.

4. The method described of covering wire with a triple insulating and impervious coating, consisting in first enveloping the wire with a covering strip or strips of rubber or its equivalents laid on longitudinally, curved around the wire, and united at the edges, immediately thereafter winding about said covering a spiral winding of fibrous tape provided with a water-proof cement, then applying a second longitudinal covering over said spiral tape in the same manner as the first, and finally vulcanizing, substantially as herein set forth.

5. A machine for applying a longitudinal coating to wires, in combination with a superposed spirally-wound coating, consisting in the combination, with a pair of rollers grooved to correspond to the wire with its longitudinal coating, and through which the wire, with its longitudinal coating, is drawn, of a hollow rotary spindle arranged in line with the issue of the wire on the delivery side of the rollers, with a rotary winding-bobbin carried by said spindle and revolved thereby around the issuing wire, together with means for revolving said rollers, and suitable operative connections or gearing between said rollers and winding-spindle, whereby the winding-bobbins are revolved simultaneously with the rollers and at such a relative rate that the winding-strip is laid spirally upon the covered wire as it issues from the rollers, substantially as herein shown and described.

6. A machine for applying two successive longitudinal coatings to wire with an intermediate wound coating, consisting of two pairs of rollers arranged respectively at some distance from each other, and respectively grooved to admit the wire with its respective and successive coverings, in combination with bobbins for containing the successive longitudinal covering-strips and delivering them to the grooves of the rollers around the entering wire, together with a hollow rotary spindle arranged between the rollers in line with the passage of the wire from one to the other, and a rotary bobbin for containing the strip for the spiral winding carried by said spindle around the wire, with means for revolving said rollers, and operative gearing or connections between said rollers and spindle, whereby the spindle revolves simultaneous with the rollers and at a relative rate therewith to lay the intermediate winding spirally between the successive longitudinal coatings, substantially as herein shown and described.

7. In a wire-covering machine, the combination, with the feeding or covering rollers $b\ b$, grooved to admit a series of separate wires, of the hollow winding-spindles $r\ r$ and their bobbins $u$, arranged in stepped or diagonal position on the delivery side of the roller, substantially as and for the purpose set forth.

8. In a wire-covering machine, the combination, with two sets of covering-rollers, $b\ b\ c\ c$, of the vibration-preventing guide-roller $t$, arranged close to the junction of the second set of rollers and parallel with their junction-line, over which the wires from the first set of rollers pass in entering the second set, substantially as and for the purpose set forth.

JOSEPH D. THOMAS.

Witnesses:
  CHAS. M. HIGGINS,
  CHAS. SPIRO.